United States Patent [19]

Plichta et al.

[11] Patent Number: 4,954,403
[45] Date of Patent: Sep. 4, 1990

[54] HIGH TEMPERATURE MOLTEN SALT THERMAL ELECTROCHEMICAL CELL

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 478,796

[22] Filed: Feb. 12, 1990

[51] Int. Cl.⁵ .................. H01M 4/36; H01M 6/36
[52] U.S. Cl. .................. 429/103; 429/218; 429/212
[58] Field of Search ............ 429/103, 112, 218; 252/182.1

[56] References Cited

U.S. PATENT DOCUMENTS

| | | | |
|---|---|---|---|
| 3,663,295 | 5/1972 | Baker | 429/102 |
| 4,117,207 | 9/1978 | Nardi et al. | 429/103 |
| 4,130,500 | 12/1978 | Melendres et al. | 252/182.1 |
| 4,304,825 | 12/1981 | Bash | 429/103 |

*Primary Examiner*—Anthony Skapars
*Attorney, Agent, or Firm*—Michael Zelenka; Roy E. Gordon

[57] ABSTRACT

The use of cobalt oxide ($Co_3O_4$) in a thermal cell as the cathode material results in a thermal cell with higher open circuit voltage than the present used iron disulfide cathodes.

5 Claims, 1 Drawing Sheet

HIGH TEMPERATURE MOLTEN SALT THERMAL ELECTROCHEMICAL CELL

The invention described herein may be manufactured, used, and licensed by or for the Government for governmental purposes without the payment to us of any royalty thereon.

This invention relates in general to a high temperature molten salt thermal electrochemical cell and in particular to such a cell including cobalt oxide ($Co_3O_4$) as the cathode material.

BACKGROUND OF THE INVENTION

High temperature molten salt thermal electrochemical cells are widely used as power sources for projectiles, rockets, bombs, mines, missiles, decoys, jammers and torpedoes. They are also used as fuses. Thermal electrochemical cells are reserve-type cells that can be activated by heating with a pyrotechnic heat source such as zirconium and barium chromate powders or mixtures of iron powder and potassium perchlorate. Early thermal batteries employed magnesium or calcium as the anode, an eutectic mixture of lithium chloride and potassium chloride as the electrolyte and cathodes of metal oxides such as copper oxide (CuO), iron oxide ($Fe_2O_3$), vanadium oxide ($V_2O_5$), tungsten oxide ($WO_3$) and metal chromates such as calcium chromate and potassium chromate. More recent thermal electrochemical cells use alloys of lithium such as lithium-aluminum, lithium-boron and lithium-silicon as anodes, an eutectic mixture of lithium chloride and potassium chloride as the electrolyte and iron disulfide as the cathode material. The use of lithium alloys as anodes instead of calcium and magnesium has resulted in higher energy densities. Further, the lithium alloy/iron disulfide thermal electrochemical cell has demonstrated improved performance over the older magnesium or calcium thermal electrochemical cells. The lithium-alloy/iron disulfide electrochemical cell is now widely used for various military applications as mentioned above and has an open circuit voltage of about 1.7 volts.

It would still be more desirable, however, for the thermal electrochemical cell to have an even higher open circuit voltage, a greater energy density, and to exhibit flat discharge plateaus under load at voltages consistently above 2.0 volts.

SUMMARY OF THE INVENTION

The general object of this invention is to provide an improved high temperature molten salt thermal electrochemical cell. A more particular object of the invention is to provide such a cell that will be improved over the presently widely used lithium alloy/iron disulfide electrochemical cell.

It has now been found that the aforementioned objects can be attained by the use of a new cathode material namely cobalt oxide ($Co_3O_4$) in conjunction with a lithium alloy as the anode and an eutectic mixture of lithium chloride and potassium chloride (m.p. 352° C.) as the electrolyte. The cell is operated at 400°-500° C. and exhibits flat discharge plateaus under load at voltages consistently above 2.0 volts.

More particularly, the electrochemical cell of the invention includes a lithium-aluminum (48 atomic % Li) alloy as the anode, a eutectic mixture of lithium chloride (59 mole %) and potassium chloride (41 mole %) with a melting point of 352° C. as the electrolyte and cobalt oxide ($Co_3O_4$) as the cathode material. The cell is fabricated by stacking 0.5 inch diameter pellets of the anode, separator material containing the electrolyte and the cathode in between disks of molybedenum current collectors. The cathode pellet is prepared by pressing 0.3 gram of cobalt oxide ($Co_3O_4$) to a pressure of 2000 pounds using an 0.5 inch die. The separator disk is prepared by pressing in a similar manner a 0.6 gram mixture of 35 weight percent magnesium oxide and 65 weight percent lithium chloride-potassium chloride eutectic electrolyte. The anode pellet is prepared similarly by pressing a 0.3 gram mixture of 20 weight percent lithium 80 weight percent lithium-aluminium alloy to 1500 pounds pressure. Due to the hygroscopic nature of the various cell components, the pellets are prepared inside a dry box with a moisture content of less than 10 ppm. The pellets are stacked in a jig and placed inside a sealed glass cell. The jig uses a high temperature stainless steel compression string that maintains a constant pressure on the pellets. Thus, when the temperature of the cell is raised to the working temperature of 400°-500° C., a slight shrinkage of pellets occurs due to the melting of the electrolyte and the use of the stainless steel compression spring allows the maintenance of the electrical contact of the electrode pellets with the current collector. The cell is operated at 400°-500° C. in a flowing atmosphere of high purity dry argon gas in order to maintain anhydrous conditions because of the hygoscopic nature of cell components.

DESCRIPTION OF THE DRAWING

Referring to FIG. 1, the cell, 10, includes lithium-aluminum alloy anode 12, a cobalt oxide cathode 14 spaced from the anode, 12, and a separator, 16, including an eutectic mixture of lithium chloride and potassium chloride as the electrolyte positioned in the spaces between said anode, 12, and said cathode, 14. A positive molybdenum current collector, 18 is in contact with cathode, 14, and a negative molybdenum current collector, 20 is in contact with anode, 12.

Figure 1:
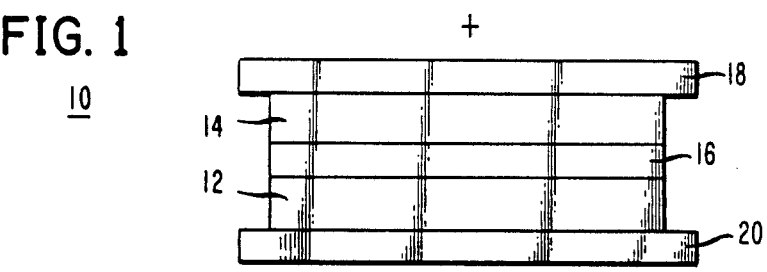
FIG. 1 shows a cross sectional view of a high temperature molten salt thermal electrochemical cell according to the invention.
Figure 2:
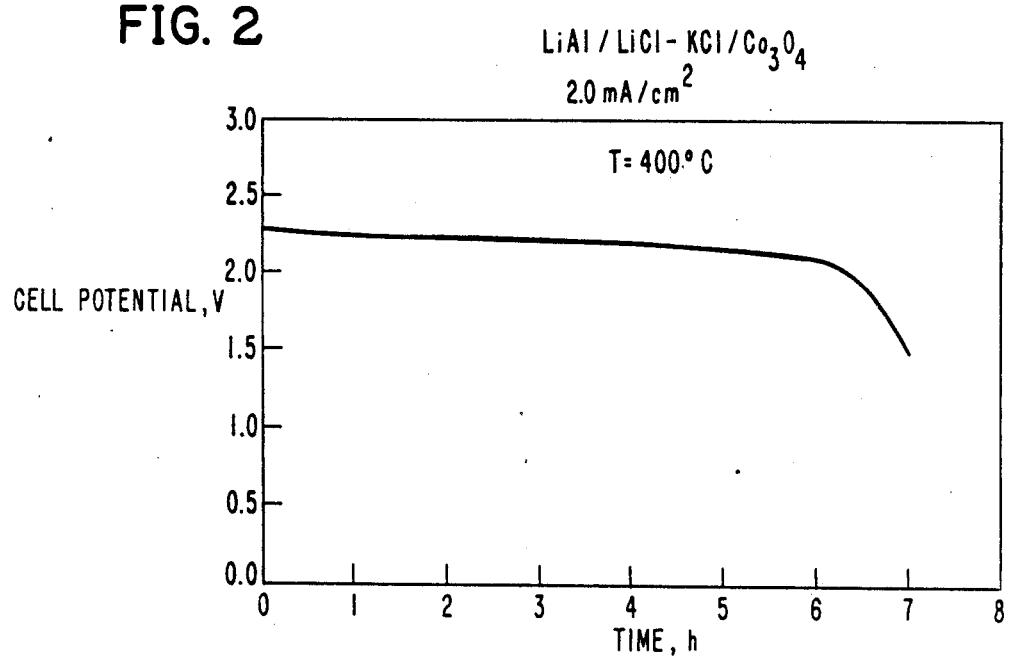
FIGS. 2 and 3 show typical discharge curves of the cell of FIG. 1 under a drain of 2 $mA/cm^2$.
Figure 3:
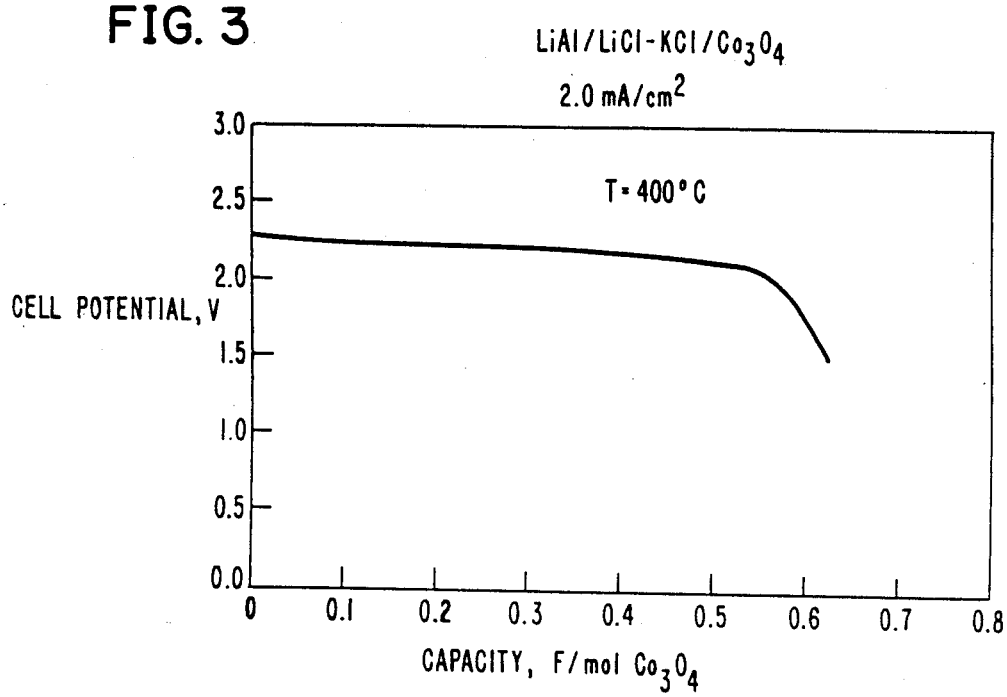

The cell exhibits an open circuit voltage of 2.308 volts and an average voltage plateau of 2.24 volts. The FIGS. 2 and 3 correspond to a discharge of the new electrochemical cell at a current density of 2 $mA/cm^2$. These cells may be discharged at current densities in excess of 100 $mA/cm^2$ which are generally encountered in thermal batteries. The higher voltage obtained of 2.3 volts with this cell as compared to the voltage of 1.7 volts as obtained with the lithium-aluminium/iron disulfide cell will translate into higher energy densities for the new thermal electrochemical cell.

We wish it to be understood that we do not desire to be limited to the exact details of construction shown and described for obvious modifications will occur to a person skilled in the art.

What is claimed is:

1. A high temperature molten salt thermal electrochemical cell including a lithium-aluminum alloy as the anode, a cathode of cobalt oxide ($Co_3O_4$) spaced from said anode, and a separator including lithium chloride-potassium chloride eutectic electrolyte in the space between said anode and said cathode.

2. A high temperature molten salt thermal cell according to claim 1 wherein the lithium-aluminium alloy of the anode includes 48 atomic percent of lithium.

3. A high temperature molten salt thermal cell according to claim 1 wherein the lithium chloride-potassium chloride eutectic electrolyte is 59 mole percent lithium chloride 41 mole percent potassium chloride.

4. A high temperature molten salt thermal electrochemical cell including a lithium-aluminium alloy of 48 atomic percent of lithium as the anode, a cathode of cobalt oxide ($Co_3O_4$) spaced from said anode, and a separator including 59 mole percent lithium chloride 41 mole percent potassium chloride eutectic electrolyte in the space between said anode and said cathode.

5. A high temperature molten salt thermal electrochemical cell according to claim 4 wherein the cell is fabricated by stacking pellets of the anode, separator material containing the electrolyte and the cathode in between disks of molybdenum current collector.

* * * * *